United States Patent [19]

Machi et al.

[11] 4,129,617

[45] Dec. 12, 1978

[54] FLUORO CARBON GRAFT COPOLYMER AND PROCESS FOR THE PRODUCTION THEREOF

[75] Inventors: Sueo Machi; Yasushi Matsui; Akio Sugishita; Takanobu Sugo; Hiroaki Taniguchi, all of Takasaki; Koichi Asano, Tokyo; Hiroshi Fujiwara, Soka, all of Japan

[73] Assignees: Japan Atomic Energy Research Institute, Tokyo; Maruzen Oil Company Limited, Osaka, both of Japan

[21] Appl. No.: 849,442

[22] Filed: Nov. 7, 1977

Related U.S. Application Data

[63] Continuation-in-part of Ser. No. 691,433, Jun. 1, 1976, abandoned.

[30] Foreign Application Priority Data

Jun. 9, 1975 [JP] Japan .................................. 50-69363

[51] Int. Cl.$^2$ ...................... C08L 27/12; C08L 27/16; C08L 27/18
[52] U.S. Cl. .................................... 260/879; 260/884; 204/159.17

[58] Field of Search ................ 260/884, 879; 204/159.17

[56] References Cited

U.S. PATENT DOCUMENTS 3,700,609   10/1972   Tregear et al. .................. 260/2.5 R

*Primary Examiner*—Carman J. Seccuro
*Attorney, Agent, or Firm*—Browdy & Neimark

[57] ABSTRACT

A novel graft copolymer and a process for the production thereof is disclosed, said graft copolymer comprising a backbone chain of a fluoropolymer and side chains grafted thereon consisting essentially of at least a member selected from the group consisting of acyloxystyrene, diacyloxystyrene, hydroxystyrene and dihydroxystyrene or consisting essentially of a mixture of at least a member selected from the group mentioned above and a polyene compound. The grafting is conveniently carried out with the aid of an ionizing radiation. The novel graft copolymer has a wide variety of uses due to its improved characteristic properties such as, for example, improved adhesion properties, improved dyeing properties, improved reactivity to other compounds and the like.

18 Claims, No Drawings

FLUORO CARBON GRAFT COPOLYMER AND PROCESS FOR THE PRODUCTION THEREOF

The present application is a continuation-in-part of U.S. application Ser. No. 691,433, filed June 1, 1976, now abandoned, the entire contents of which are hereby incorporated by reference.

This invention relates to a novel graft copolymer and a process for the production thereof. More particularly, the invention relates to a novel graft copolymer comprising (1) a backbone chain of a fluoropolymer and (2) side chains grafted thereon consisting essentially of at least a member selected from the group consisting of acyloxystyrene and diacyloxysterene (hereinafter referred to as "an acyloxystyrene" or "acyloxystyrenes") and hydroxystyrene and dihydroxystyrene (hereinafter referred to as "an hydroxystyrene" or "hydroxystyrenes"); or a novel graft copolymer comprising (1) a backbone chain of a fluoropolymer and (2) side chains co-grafted thereon consisting essentially of (a) an acyloxystyrene and/or an hydroxystyrene and (b) a polyene compound. One object of this invention is to provide a process for the production of novel graft copolymers as mentioned above having improved characteristic properties, while another object of this invention is to improve various properties of fluoropolymers including properties such as adhesion properties, dyeing properties, reactivity to other compounds and the like. Further objects of this invention are to provide novel graft copolymers as mentioned above.

After a variety of investigations to attain said purposes, the present inventors have found that an acyloxystyrene and/or a hydroxystyrene can be grafted onto a fluoropolymer by means of an ionizing radiation through a so-called "pre-irradiation method" or, alternatively, by means of a so-called "simultaneous-irradiation" method, and that a mixture of (a) an acyloxystyrene and/or a hydroxystyrene and (b) a polyene compound can also be co-grafted onto a fluoropolymer in the same manner as mentioned above.

The graft copolymer of the present invention, prepared by grafting an acyloxystyrene and/or hydroxystyrene onto a fluoropolymer, is quite a new polymer which is improved in adhesion properties, dyeing properties, reactivity to other compounds and the like as compared with prior art fluoropolymers, and has a wide variety of uses.

Another type of a novel graft copolymer of the present invention, prepared by co-grafting a combination of (1) an acyloxystyrene and/or a hydroxystyrene and (2) a polyene compound onto a fluoropolymer, specifically shows superiority to a polymer onto which a polyene compound is not grafted, in characteristic properties such as chemical-resisting properties, heat resistance and the like, which is due to a partial crosslinkage structure brought about by a co-grafted polyene compound. Thus, the gist of the present invention consists in a process for the production of graft copolymers characterized in that a monomer or monomers consisting essentially of an acyloxystyrene and/or a hydroxystyrene or a mixture of monomers consisting essentially of (1) an acyloxystyrene and/or a hydroxystyrene and (2) a polyene compound is co-grafted onto a fluoropolymer with the aid of an ionizing radiation.

Fluoropolymers which can be used in the practice of the present invention include fluorocarbon polymers or copolymers in which at least one of the monomers thereof is a fluorocarbon, and, more particularly, polymers or copolymers of one or more monomers selected from the group consisting of fluoro- or fluoro and chloro- substituted lower alkylene, particularly ethylene and propylene, or vinyl ether, as well as copolymers of said one or more monomers with ethylene or other copolymerizable monomer. Some non-limitative examples include polyethylene tetrafluoride, polyvinylidene fluoride, polymonochlorotrifluoroethylene, ethylene-ethylene tetrafluoride copolymer, ethylene tetrafluoride-propylene hexafluoride copolymer, ethylene tetrafluoride-perfluoro[2-(2-fluorosulfonylethoxy)propylvinyl] copolymer, ethylenetetrafluoride-perfluorovinylether copolymer (Teflon PFA), monochlorotrifluoroethyleneethylene copolymer (HARLAR), vinylidene fluoride-propylene hexafluoride copolymer and the like. These polymers can be used in the form of powder, fiber, film and the like as well as in other suitable forms. An acyloxystyrene, namely acyloxystyrene or diacyloxystyrene, used for the graft polymerization of the present invention is given by the generic formula:

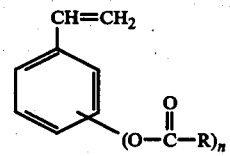

wherein n is 1 to 2, substituent(s) can take any position and R represents a hydrocarbon group selected from aliphatic hydrocarbons of straight or branched chain having from 1 to 20 carbon atoms, alicyclic hydrocarbons and aromatic hydrocarbons. Typical examples of such hydrocarbons include acetoxystyrene, diacetoxystyrene, propionyloxystyrene, dipropionyloxystyrene, butyroyloxystyrene, dibutyroyloxystyrene, benzoyloxystyrene, dibenzoyloxystyrene and the like, though acetoxystyrene and diacetoxysterene are used most commonly.

A hydroxystyrene, namely hydroxystyrene or dihydroxystyrene, used for the graft polymerization of the present invention includes all the isomers having substituents in different position as well as combinations of any two or more of them. Polyene compounds used for the graft polymerization of the present invention include those compounds which have two or more polymerizable double bonds in their molecule such as, for example, divinylbenzene, isoprene, butadiene, cyclopentadiene, ethylidene and the like as well as polyalcohol esters of acrylic or methacrylic acid, divinyl ester of adipic acid and the like. Above all, divinylbenzene and polyalcohol esters of acrylic acid are the most preferable. There are three isomers of divinylbenzenes, that is ortho-, meta-, and para-divinylbenzenes. Any of these three isomers can be used conveniently, though a mixture of them is generally used directly. Commercially available divinylbenzene usually comprises a mixture containing about 45% by weight or so of ethylvinylbenzene in addition to divinylbenzene. This mixture can be used as such for the reaction.

When it is contemplated in the practice of the present invention to co-graft a monomeric mixture consisting essentially of (1) an acyloxystyrene and/or a hydroxystyrene and (2) a polyene compound onto a fluoropolymer, a mixture of an acyloxystyrene and a polyene compound, or a mixture of a hydroxystyrene and a polyene compound, or a mixture of an acyloxystyrene and a hydroxystyrene and a polyene compound can be used, alternatively, for the reaction as a grafting component.

The ratio in the mixture of (1) an acyloxystyrene and/or a hydroxystyrene to (2) a polyene compound can be determinend arbitrarily. However, since the properties of the resulting graft copolymers change depending on the ratio mentioned above, it should be determined depending on the desired properties of the specifically intended graft copolymer. Usually, however, a mixture of (1) an acyloxystyrene and/or a hydroxystyrene and (2) a polyene compound in the ratio in the region of 200:1–1:1 is conveniently employed, with the preferred ratio being in the range of 50:1–2:1.

An acyloxystyrene and/or a hydroxystyrene or a mixture thereof with a polyene compound is dissolved in an organic solvent before being used for the graft copolymerization. Any organic solvent which can dissolve an acyloxystyrene and/or a hydroxystyrene or a mixture thereof with a polyene compound to give a homogeneous solution is useful for such purpose. Typical useful organic solvents are, for example: ketones such as acetone, methylethylketone and the like; esters such as ethyl acetate, butyl acetate and the like; alcohols such as methanol, ethanol and the like; ethers such as tetrahydrofuran, dioxane and the like; amides such as N,N-dimethylformamide, N,N-dimethylacetamide and the like; aromatic hydrocarbons such as benzene, toluene and the like; aliphatic and cyclocyclic hydrocarbons such as n-heptane, cyclohexane and the like; or mixtures thereof.

There is no need to specifically limit the monomer content of the solution. However, a concentration in the range of 0.1 to 80% by weight is proper, with the range of 5–50% by weight being preferred.

The graft polymerization of the present invention is carried out by making use of an ionizing radiation. There are two types of graft polymerizations effected by means of an ionizing radiation. One is known as the "pre-irradiation" method and comprises irradiating a polymer which will constitute a backbone chain of the resulting graft copolymer with an ionizing radiation in the absence of a graft monomer followed by contacting the irradiated polymer with a graft monomer. The other is known as a "simultaneous irradiation" method and comprises irradiating the polymer in the presence of a graft monomer. The process of the present invention can be applied to either type of graft polymerizations.

Typical useful ionizing radiations are, for example: gamma-rays, X-rays, electron beams, alpha-rays as well as mixtures thereof. The strength of the ionizing radiation used, namely the proper dose-rate, is in the range of about $10^3$ to about $10^{11}$ rads/hour. When gamma-rays are used, a dose-rate in the range of $10^5$ to $10^6$ is generally preferred. When an electron beam is used, a high level dose-rate in the range of $10^9$ to $10^{11}$ rads/hour can be used advantageously. It is especially effective to use an electron beam generated by an electron accelerator because it enables high dose irradiation in a short time. A total dose usually required in the practice of the graft polymerization of the present invention is $10^5$ rads or greater. The temperature at which irradiation is effected in the course of a "pre-irradiation" method is not restricted. However, the disappearance of radicals may occur as the temperature increases. Thus, room temperature or lower is preferred for carrying out irradiation.

In case a "pre-irradiation" method is used in the practice of the present invention, a fluoropolymer can be irradiated with an ionizing radiation in a vacuum, in nitrogen current or in air to form on the fluoropolymer trapping radical-sites or polymeric peroxide-sites followed by dipping the irradiated fluoropolymer in an organic solvent solution containing an acyloxystyrene and/or a hydroxystyrene or a mixture thereof with a polyene compound to make the monomer or monomers graft onto the polymer at trapping radical-sites or polymeric peroxide-sites thus formed. When a polyene compound is used, partial cross-linkings of the resulting graft copolymer due to the grafted polyene compound can be observed. When the irradiation is effected in a vacuum or in a nitrogen current, the graft polymerization reaction proceeds satisfactorily at room temperature or at a lower temperature, though the reaction can also proceed at a temperature higher than room temperature. When the irradiation is effected in air, the graft polymerization reaction is advantageously carried out at a temperature at or above 60° C. From an industrial viewpoint, the irradiation in air or in a nitrogen current is preferred.

In case a "simultaneous irradiation" method is used in the practice of the present invention, a fluoropolymer is dipped in an organic solvent solution containing an acyloxystyrene and/or a hydroxystyrene or a mixture thereof with a polyene compound followed by irradiating the solution with an ionizing radiation to make the monomer or monomers graft onto the sites on the polymer where radicals are formed, immediately after the formation of the radicals. When a polyene compound is used, cross-linkings due to the grafted polyene compound may occur as in the case of a "pre-irradiation" method. Room temperature is satisfactory for the reaction, but higher temperatures can be used.

The oxygen present in a solution of monomers may sometimes hinder the reaction at the time when graft polymerizations are carried out. So, it is preferred to reduce previously the amount of oxygen dissolved in the solution by proper means such as, for example, replacement with nitrogen and the like.

The concentrations of an acyloxystyrene and/or a hydroxystyrene or a mixture thereof with a polyene compound to be used for the reaction of graft polymerization can be adjusted depending on the degree of grafting of the desired graft copolymers.

There is no need to specifically restrict the degree of polymerization of the graft copolymer to be produced. However, in order to attain substantial improvement in the properties of the resulting modified fluoropolymer, it is preferred to restrict the degree of polymerization to 0.1% by weight or more. The graft copolymers thus produced are washed with an organic solution according to demand.

Graft copolymers having side chains containing an acyloxystyrene can be hydrolyzed according to demand to change an acyloxy group in the side chain into a hydroxy group. This hydrolysis treatment can be practiced easily under moderate conditions. That is, acid or base is used as a catalyst, and a graft copolymer is placed in an aqueous solution containing any of said catalysts or in a mixture of water and a water-soluble organic solvent containing any of said catalysts to effect a hydrolysis reaction of an acyloxy group in the side-chains. Since the hydrolysis reaction is primarily carried out in the heterogeneous system, it is preferred to effect the reaction in a mixture of water with a water-soluble organic solvent such as alcohol, ketone and the like in order to improve the affinity between the substrate and the catalyst and to be able to dissolve an organic acid released under the influence of an acidic catalyst, when it is used.

A temperature in the range of 50°–100° C. is preferred for the hydrolysis. In this hydrolysis treatment, the degree of hydrolysis of an acyloxy group in side-chains can be varied arbitrarily.

The present invention provides a novel graft copolymer consisting essentially of a fluoropolymer as a backbone chain and side chains consisting essentially of an acyloxystyrene and/or a hydroxystyrene or a mixture thereof with a polyene compound, said polyene compound in the side chains being partially cross-linked to form reticulation structure in case a polyene compound is used. The graft copolymers thus obtained according to the present invention are free from the defects of prior art fluoropolymers. That is, the novel graft copolymers have improved or newly endowed characteristics properties such as improved or excellent adhesion properties, dyeing properties, reactivities with other compounds and the like. Graft copolymers having side chains containing a hydroxystyrene group in side chains are particularly improved in such properties as mentioned above and have a wide variety of uses as raw materials for the production of reactive high-polymers and the like.

The present invention will be further illustrated by the following examples.

EXAMPLE 1

In one of the two portions of an H-shaped glass ampoule was placed 70 ml of a solution consisting of 50% by weight of p-acetoxystyrene and 50% by weight of acetone followed by applying thereto a freezing and thawing method in a vacuum to effect degassing satisfactorily. In the other portion of the H-shaped ampoule was placed 3.753 g of a strip of polyvinylidene fluoride film 0.1 mm thick which had been irradiated previously with 30 Mrads of electron beams in air at −20° C. (2 MeV, 1 mA) before it was fully evacuated. After a satisfactory vacuum was ensured, the monomer solution was removed into the portion where the film strip was placed to make them react with each other at 70° C. for 4 hours. At the end of said reaction, the ampoule was opened to remove the film strip which was washed well with acetone and was dried at reduced pressure until the weight reached a constant value. The degree of grafting determined by calculation from the weight difference of the film strip between before and after the reaction was 157%. This product did not show any weight change even after repeated extractions with acetone.

In the infrared absorption spectrum of the film thus treated were observed strong absorptions peculiar to esters in the vicinity of 1770 cm$^{-1}$ and 1200 cm$^{-1}$ and other absorptions peculiar to aromatic compounds in the vicinity of 1615 cm$^{-1}$ and 1515 cm$^{-1}$ in addition to the characteristic absorption of polyvinylidene fluoride, which clearly showed that p-acetoxystyrene was grafted to polyvinylidene fluoride.

The film obtained as mentioned above was placed in a 100 ml-flask with cooling tube attached, and 50 ml of a 1:4 concentrated hydrochloric acid/methanol solution was added to the flask before it was heated in a water bath for 30 minutes. The examination, by means of infrared absorption spectrum, of the film thus treated showed that the ester groups had been hydrolyzed completely and that a new absorption due to phenolic hydroxyl group was observed.

EXAMPLE 2

Into one portion (having thinner wall) of an H-shaped glass ampoule (10 mm in diameter, 0.5 mm thick in one of the two portions and 1 mm thick in the other portion) was put a strip of polyethylene tetrafluoride film (120μ thick and 1.08 g in weight) which had been washed well with acetone, while into the other portion was put 10 ml of a solution consisting of 50% by weight of p-acetoxystyrene and 50% by weight of benzene. After degassing satisfactorily in a vacuum by means of a freezing and thawing method, the ampoule was heat-sealed. The monomer solution was frozen and was covered fully with lead sheet. Then, the strip of polyethylene tetrafluoride in the evacuated ampoule was subjected to an electron beam from an electron accelerator (2 MeV, 1 mA) for a total dose of 7 Mrad, while the entire H-shaped cell was being cooled at −30° C. After irradiation, the monomer solution was moved into the other portion in which the film strip was placed to make them react with each other at 60° C. for 19 hours. At the end of this reaction, the ampoule was opened to remove the film. Then, the film was washed well with acetone and was dried in a vacuum until the weight reached a constant value. The degree of grafting determined by calculation of the weight difference between before and after the reaction was 13.5%. This product did not show any more weight change even after repeated extractions with acetone.

EXAMPLE 3

Into one portion of an H-shaped glass ampoule was placed 70 ml of a solution consisting of 45% by weight of p-acetoxystyrene, 5% by weight of divinylbenzene (of 55% purity containing 45% by weight of ethyl styrene) and 50% by weight of tetrahydrofuran followed by fully degassing in a vacuum by means of a freezing and thawing method. Into the other portion of the H-shaped ampoule was placed a strip of ethylene-ethylene tetrafluoride copolymer film (150μ thick and 4.147 g in weight) which had been cooled to −20° C. and irradiated in nitrogen current with electron beams (in the energy of 1.5 MeV with electron current of 1 mA) to a dose of 3 Mrads before evacuating the cell. When a satisfactory vacuum was obtained, the monomer solution was moved from one portion to the other in which the film strip was placed to make them react with each other at 60° C. for 7 hours. At the end of the reaction, the film was washed well with acetone and was dried at reduced pressure until the weight reached a constant value. The degree of grafting determined by calculation from the weight difference between before and after the reaction was 34.8%.

The film was hydrolyzed by the same treatment as in Example 1 to determine the degrees of grafting of p-acetoxystyrene and divinylbenzene by the calculation from the weight difference between before and after said treatment, which degrees of grafting were 26.8% and 8.0% respectively.

EXAMPLE 4

In the same manner as in Example 3, 70 ml of a solution consisting of 47.5% by weight of p-acetoxystyrene, 2.5% by weight of divinylbenzene and 50% by weight of tetrahydrofuran was placed into one portion of an H-shaped glass ampoule before it was fully evacuated. A strip of ethylene-ethylene tetrafluoride copolymer film (150μ thick and 3.993 g in weight) which had been cooled to −20° C. and irradiated in nitrogen current with an electron beam (in the energy of 1.5 MeV with electron current of 1 mA) for a dose of 1 Mrad was placed in the other portion of the H-type ampoule followed by evacuating the compartment. When a satisfactory vacuum was obtained, the monomer solution was moved from one portion to the other where the film strip was placed to make them react with each other at 60° C. for 19 hours. The degree of grafting was 78.1%. The film was hydrolyzed in the same manner as in Example 1 and the degrees of grafting of p-acetoxystyrene and of divinylbenzene were determined by calculation from the weight difference between before and after the hydrolysis treatment, which were 52.8% and 25.3% respectively.

EXAMPLE 5

In the same manner as in Example 3, 70 ml of a solution consisting of 47.5% by weight of 3,4-diacetoxystyrene, 2.5% by weight of divinylbenzene and 50% by weight of tetrahydrofuran was placed in one of the two portions of an H-type ampoule and it was fully evacuated. Into the other portion was placed a strip of ethylene-ethylene tetrafluoride copolymer film (150μ thick, 3.875 g in weight) which had been cooled to −20° C. and irradiated in nitrogen current with electron beams (in the energy of 1.5 MeV with electron current of 1 mA) to a dose of 3 Mrads and the cell was fully evacuated. When a satisfactory vacuum was obtained, the monomer solution was moved into the portion in which the film strip was placed to make them react with each other at 60° C. for 19 hours. The degree of grafting was 89.1%. The degrees of grafting of 3,4-diacetoxystyrene and of divinylbenzene determined by calculation from the weight difference between before and after the hydrolysis treatment carried out in the same manner as in Example 1 were 75.7% and 13.4% respectively.

EXAMPLE 6

In the same manner as in Example 3, 70 ml of a solution consisting of 50% by weight of p-acetoxystyrene, and 50% by weight of toluene was placed in one portion of an H-shaped glass ampoule before it was fully evacuated. Into the other portion of the same ampoule was placed a strip of ethylene tetrafluoride-propylene hexafluoride copolymer film (120μ thick and 2.503 g in weight) which had been cooled to −20° C. and irradiated in nitrogen current with an electron beam (in the energy of 1.5 MeV with electron current of 1 mA) for a dose of 3 Mrad and the portion was evacuated. When a satisfactory vacuum was obtained, the monomer solution was moved into the other side portion in which the film strip was placed to make them react with each other at 60° C. for 24 hours. The degree of grafting was 29.6%.

EXAMPLE 7

In the same manner as in Example 1, 70 ml of a solution consisting of 47.5% by weight of p-acetoxystyrene, 2.5% by weight of divinylbenzene and 50% by weight of toluene was placed in one portion of an H-type glass ampoule before it was fully evacuated. Into the other portion was placed a strip of ethylene tetrafluoride-propylene hexafluoride copolymer film (120μ thick and 2.773 g in weight) which had been cooled to −20° C. and irradiated in nitrogen current with an electron beam (in the energy of 1.5 MeV with electron current of 1 mA) for a dose of 3 Mrads. Then the portion was fully evacuated. When a satisfactory vacuum was obtained, the monomer solution was moved into the other side portion to make them react with each other at 60° C. for 24 hours. The degree of grafting was 11.3%.

According to the same procedure as in Example 1, the film was subjected to hydrolysis treatment and the degrees of grafting of p-acetoxystyrene and of divinylbenzene which were 8.8% and 2.5% respectively, were determined by calculation from the weight difference before and after the hydrolysis treatment.

EXAMPLE 8

Into a 30 ml-glass ampoule was placed a strip of ethylene-ethylene tetrafluoride copolymer film (120μ thick and 0.483 g in weight) which had been washed well with acetone, to which 20 ml of a solution consisting of 40% by weight of p-hydroxystyrene and 60% by weight of tetrahydrofuran was added followed by fully evacuating the ampoule by means of a freezing and thawing method repeatedly before it was heat-sealed. This was subjected to Co-60 gamma rays at a dose rate of $5 \times 10^5$ rads/hr for 16 hours. At the end of the irradiation, the film strip was removed from the ampoule and was washed well with acetone to fully remove p-hydroxystyrene homopolymer formed as a by-product and then the film was dried at reduced pressure until the weight reached a constant value. The degree of grafting calculated from the weight difference between before and after the reaction was 68.7%.

The infrared absorption spectrum of this film showed that it included, in addition to the characteristic absorption of ethylene-ethylene tetrafluoride copolymer, the absorption of OH in the vicinity of 3300 cm$^{-1}$, the other absorptions peculiar to aromatic nucleus in the vicinities of 1615 cm$^{-1}$ and 1515 cm$^{-1}$ and the absorption of C—O in the vicinity of 1250 cm$^{-1}$. It clearly showed that p-hydroxystyrene was grafted onto ethylene-ethylene tetrafluoride copolymer.

EXAMPLE 9

In one of the two portions of an H-shaped glass ampoule was placed in 70 ml of a solution consisting of 50% by weight of p-acetoxy styrene and 50% by weight of acetone followed by applying thereto a vacuum freezing and thawing method to pursue degassification satisfactorily. In the other portion of the same H-shaped ampoule was placed a strip of polymonochlorotrifluoroethylene film 0.1 mm thick and 3.204 g in weight which has been irradiated previously with 10 Mrads of electron beams (2 MeV, 1 mA) in a stream of nitrogen at room temperature before it was fully evacuated. When a satisfactory vacuum was obtained, the solution of monomers was moved into the other portion where the strip of film was placed to make them react with each other at 60° C. for 3 hours. At the end of the reaction, the ampoule was opened to remove the strip of film which was washed well with acetone and was dried at reduced pressure until the weight reached a constant value. The degree of grafting determined from the weight difference before and after the reaction was 142%. This film did not show any weight change even after repeated extractions with acetone.

In the infrared absorption spectrum of the film thus obtained were observed strong absorptions peculiar to esters in the vicinity of 1770 cm$^{-1}$ and 1200 cm$^{-1}$ and other absorptions peculiar to aromatic compounds in the vicinity of 1615 cm$^{-1}$ and 1515 cm$^{-1}$ in addition to the characteristic absorption of polymonochlorotrifluoroethylene, which clearly showed that p-acetoxystyrene was grafted onto polymonochlorotrifluoroethylene.

The above film was placed in a 100 ml flask with a cooling tube attached, and 50 ml of a solution of concentrated hydrochloric acid and methanol in the ratio of 1:4 (volume) was added thereto and the flask was heated in a warm water bath for 30 minutes. The examination of the resulting film by means of infrared absorption spectrum showed that the ester groups had been hydrolyzed completely and that a new absorption due to phenolic hydroxyl group was observed.

EXAMPLE 10

The same procedures were repeated as in Example 9 except that 70 ml of a solution of monomers consisting of 45.0% by weight of p-acetoxystyrene, 5% by weight of divinylbenzene and 50% by weight of tetrahydrofuran was used instead of the solution of monomers in Example 9 and 3.351 g of strip of polymonochlorotrifluoroethylene film was used instead of the strip of film used in Example 1 and the reaction was carried out for 4 hours at 60° C.

The total degree of grafting of the resulting film was 106.5% and the degree of grafting concerning p-acetoxystyrene only was 76.3%.

EXAMPLE 11

In a 30 ml glass ampoule was placed a strip of ethylene tetrafluoride-perfluoro[2-(2-fluorosulfonylethoxy)-propylvinylether] copolymer, 100µ thick and 0.105 g in weight, which had been washed well with acetone and 20 ml of a solution consisting of 50% by weight of p-acetoxystyrene and 50% by weight of toluene followed by fully degassing the material by repeated application of a freezing and thawing method before the ampoule was sealed. The glass ampoule was placed in a water bath at 60° C. and was irradiated with gamma-rays from Co-60 at a dose rate of $1 \times 10^5$ rad/hr for 7 hours. When the irradiation was finished, the film was taken out of the ampoule and was washed well with acetone to completely remove the homopolymer of p-acetoxystyrene obtained as a by-product and then the film was dried until the weight reached a constant value.

The degree of grafting of the resulting film was 41.5%.

EXAMPLE 12

The same experiment as in Example 11, was repeated except that ethylene tetrafluoride-perfluorovinyl ether copolymer (Teflon PFA, DuPont) 80µ thick and 2.587 g in weight was used instead of the film used in Example 11; a solution consisting of 50% by weight of p-acetoxystyrene and 50% by weight of acetone was used instead of the solution used in Example 11; and the graft reaction was carried out by means of a "simultaneous irradiation" method using γ-rays at a dose rate of $1 \times 10^5$ rads/hour for 6 hours. The degree of grafting of the resulting copolymer determined in the same manner as in Example 11 was 43.9%.

EXAMPLE 13

The same experiment as in Example 9 was repeated except that monochlorotrifluoroethylene-ethylene copolymer (HARLAR) 110µ thick and 1.520 g in weight was used instead of the film used in Example 9; a solution consisting of 50% by weight of p-acetoxystyrene, 10% by weight of divinylbenzene and 40% by weight of acetone was used instead of the solution used in Example 9; and the graft reaction was carried out by means of a "pre-irradiation" method wherein the irradiation was pursued with 10 Mrads of electron beams and the reaction of the film with monomers was effected at 60° C. for 4 hours. The weight of the final product was 3.052 g, which showed that the degree of grafting was 100.8%.

It will be obvious to those skilled in the art that various changes may be made without departing from the scope of the invention and the invention is not to be considered limited to what is described in the specification.

What is claimed is:

1. A novel graft copolymer comprising a backbone chain of fluoropolymer and side chains grafted thereon consisting essentially of at least one member selected from the group consisting of hydroxystyrenes having the generic formula:

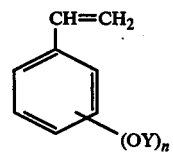

wherein Y represents a hydrogen atom or a group having the formula

wherein R is a hydrocarbon group, and n represents an integer of 1 or 2, said fluoropolymer being a fluorocarbon polymer or copolymer in which at least one of the monomers thereof is a fluorocarbon.

2. A novel graft copolymer comprising a backbone chain of a fluoropolymer and side chains grafted therein consisting essentially of (1) at least one member selected from the group consisting of hydroxystyrenes and acyloxystyrenes having the generic formula:

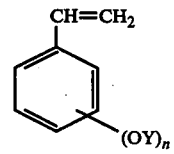

wherein Y represents a hydrogen group or a group having the formula

wherein R is a hydrocarbon group, and n represents an integer of 1 or 2, and (2) a polyene compound, said fluoropolymer being a fluorocarbon polymer or copolymer in which at least one of the monomers thereof is a fluorocarbon.

3. A graft copolymer in accordance with claim 1, wherein the fluoropolymer is a polymer or copolymer of one or more monomers selected from the group consisting of fluoro- or fluoro and chloro- substituted lower alkylene or vinyl ether, or a copolymer of said one or more monomers with ethylene or another copolymerizable monomer.

4. A graft copolymer in accordance with claim 1, wherein the fluoropolymer is a member selected from the group consisting of polyethylene tetrafluoride, polyvinylidene fluoride, polymonochlorotrifluoroethylene, ethylene-ethylene tetrafluoride copolymer, ethylene tetrafluoride-propylene hexafluoride copolymer, ethylene tetrafluoride-perfluoro[2-(2-fluorosulfonylethoxy)propylvinyl] copolymer, ethylenetetrafluoride-perfluorovinylether copolymer, monochlorotrifluoroethyleneethylene copolymer and vinylidene fluoride-propylene hexafluoride copolymer.

5. A graft copolymer in accordance with claim 1, wherein the hydroxystyrene is a member selected from the group consisting of hydroxystyrene and dihydroxystyrene and the acyloxystyrene is a member selected from the group consisting of acyloxystyrene and diacyloxystyrene.

6. A graft copolymer in accordance with claim 2, wherein the fluoropolymer is a polymer or copolymer of one or more monomers selected from the group consisting of fluoro- or fluoro and chloro- substituted lower alkylene or vinyl ether, or a copolymer of said one or more monomers with ethylene or another copolymerizable monomer.

7. A graft copolymer in accordance with claim 2, wherein the fluoropolymer is a member selected from the group consisting of polyethylene tetrafluoride, polyvinylidene fluoride, polymonochlorotrifluoroethylene, ethylene-ethylene tetrafluoride copolymer, ethylene tetrafluoride-propylene hexafluoride copolymer, ethylene tetrafluoride-perfluoro[2-(2-fluorosulfonylethyoxy)propylvinyl] copolymer, ethylenetetrafluoride-perfluorovinylether copolymer, monochlorotrifluoroethylene-ethylene copolymer and vinylidene fluoride-propylene hexafluoride copolymer and the polyene compound is a member selected from the group consisting of divinylbenzene, isoprene, butadiene, cyclopentadiene, ethyldiene, polyalcohol esters of acrylic and methacrylic acids, and divinyl esters of adipic acid.

8. A graft copolymer in accordance with claim 2, wherein the hydroxystyrene is a member selected from the group consisting of hydroxystyrene and dihydroxystyrene and the acyloxystyrene is a member selected from the group consisting of acyloxystyrene and diacyloxystyrene and the polyene compound is a member selected from the group consisting of divinylbenzene, isoprene, butadiene, cyclopentadiene, ethylidene, polyalcohol esters of acrylic and methacrylic acids, and divinyl esters of adipic acid.

9. A process for the production of graft copolymers characterized by grafting a monomer or a mixture of monomers consisting essentially of at least a member selected from the group consisting of hydroxystyrene and acyloxystyrenes having the generic formula:

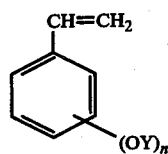

wherein Y represents a hydrogen atom or a group having the formula:

wherein R is a hydrocarbon group, and n represents an integer of 1 or 2, onto a fluoropolymer by means of an ionizing radiation, said fluoropolymer being a fluorocarbon polymer or copolymer in which at least one of the monomers thereof is a fluorocarbon.

10. A process for the production of graft copolymers characterized by grafting a mixture of monomers consisting essentially of (1) at least a member selected from the group consisting of hydroxystyrenes and acyloxystyrenes having the generic formula:

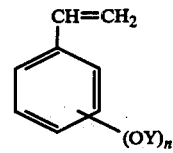

wherein Y represents a hydrogen group or a group having the formula:

wherein R is a hydrocarbon group, and n represents an integer of 1 to 2, and (2) polyene compound onto a fluoropolymer by means of an ionizing radiation, said fluoropolymer being a fluorocarbon polymer or copolymer in which at least one of the monomers thereof is a fluorocarbon.

11. A process according to claim 9, wherein the fluoropolymer is a polymer or copolymer of one or more monomers selected from the group consisting of fluoro- or fluoro and chloro- substituted lower alkylene or vinyl ether, or a copolymer of said one or more monomers with ethylene or another copolymerizable monomer.

12. A process in accordance with claim 9, wherein the fluoropolymer is a member selected from the group consisting of polyethylene tetrafluoride, polyvinylidene fluoride, polymonochlorotrifluoroethylene, ethylene-ethylene tetrafluoride copolymer, ethylene tetrafluoride-propylene hexafluoride copolymer, ethylene tetrafluoride-perfluoro[2-(2-fluorosulfonylethoxy)propylvinyl]copolymer, ethylenetetrafluoride-perfluorovinylether copolymer, monochlorotrifluoroethylene-ethylene copolymer and vinylidene fluoride-propylene hexafluoride copolymer.

13. A process in accordance with claim 10, wherein the fluoropolymer is a polymer or copolymer of one or more monomers selected from the group consisting of fluoro- or fluoro and chloro- substituted lower alkylene or vinyl ether, or a copolymer of said one or more monomers with ethylene or another copolymerizable monomer.

14. A process in accordance with claim 10, wherein the fluoropolymer is a member selected from the group consisting of polyethylene tetrafluoride, polyvinylidene fluoride, polymonochlorotrifluoroethylene, ethylene-ethylene tetrafluoride copolymer, ethylene tetrafluoride-propylene hexafluoride copolymer, ethylene tetrafluoride-perfluoro[2-(2-fluorosulfonylethoxy)propylvinyl]copolymer, ethylenetetrafluoride-perfluorovinylether copolymer, monochlorotrifluoroethylene-ethylene copolymer and vinylidene fluoride-propylene hexafluoride copolymer.

15. A process in accordance with claim 9, wherein the graft reaction is carried out by means of a pre-irradiation method.

16. A process according to claim 9, wherein the graft reaction is carried out by means of a simultaneous irradiation method.

17. A process in accordance with claim 10, wherein the graft reaction is carried out by means of a pre-irradiation method.

18. A process in accordance with claim 10, wherein the graft reaction is carried out by means of simultaneous irradiation method.

* * * * *